(12) United States Patent
Donderici

(10) Patent No.: US 12,479,464 B2
(45) Date of Patent: Nov. 25, 2025

(54) OPTIMIZATION OF AUTONOMOUS VEHICLE HARDWARE CONFIGURATION USING CONTINUOUS LEARNING MACHINE

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 200 days.

(21) Appl. No.: 17/977,833

(22) Filed: Oct. 31, 2022

(65) Prior Publication Data
US 2024/0140473 A1 May 2, 2024

(51) Int. Cl.
*B60W 60/00* (2020.01)
*B60W 40/08* (2012.01)

(52) U.S. Cl.
CPC .......... *B60W 60/001* (2020.02); *B60W 40/08* (2013.01); *B60W 2420/408* (2024.01); *B60W 2540/18* (2013.01); *B60W 2554/4049* (2020.02)

(58) Field of Classification Search
CPC .............. B60W 60/001; B60W 40/08; B60W 2554/4049; B60W 2420/408; B60W 2540/18
See application file for complete search history.

(56) References Cited

U.S. PATENT DOCUMENTS

| | | | |
|---|---|---|---|
| 11,403,492 B2 * | 8/2022 | Valois | G06N 3/084 |
| 11,829,143 B2 * | 11/2023 | Valois | G01C 21/3848 |
| 2022/0204020 A1 * | 6/2022 | Misu | B60W 60/001 |

* cited by examiner

*Primary Examiner* — Gertrude Arthur Jeanglaude
(74) *Attorney, Agent, or Firm* — Honigman LLP; Matthew H. Szalach; Jonathan P. O'Brien

(57) ABSTRACT

The disclosed technology provides solutions for optimizing a hardware configuration of an autonomous vehicle (AV) using continuous learning machine. Processes of the disclosed technology can include steps for collecting AV sensor data, receiving hardware profile data relating to the AV sensor data, wherein the hardware profile data describes a hardware configuration of an AV, and providing the AV sensor data and the hardware profile data to a continuous learning machine model of an AV stack. The process can further include receiving an output of the continuous learning machine model based on the AV sensor data and the hardware profile data and determining an updated hardware configuration to replace the hardware configuration based on the output of the continuous learning machine model. Systems and machine-readable media are also provided.

8 Claims, 6 Drawing Sheets

OPTIMIZATION OF AUTONOMOUS VEHICLE HARDWARE CONFIGURATION USING CONTINUOUS LEARNING MACHINE

BACKGROUND

1. Technical Field

The disclosed technology provides solutions for optimizing a hardware design and operation and, more specifically, optimizing a hardware configuration of an autonomous vehicle using continuous learning machine.

2. Introduction

An autonomous vehicle (AV) is a motorized vehicle that can navigate without a human driver. An exemplary AV can include various sensors, such as a camera sensor, a light detection and ranging (LIDAR) sensor, and a radio detection and ranging (RADAR) sensor, amongst others. The sensors collect data and measurements that the AV can use for operations such as navigation. The sensors can provide the data and measurements to an internal computing system of the AV, which can use the data and measurements to control various mechanical systems of the AV, such as vehicle propulsion system/s, braking system/s, and/or steering system/s, etc. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
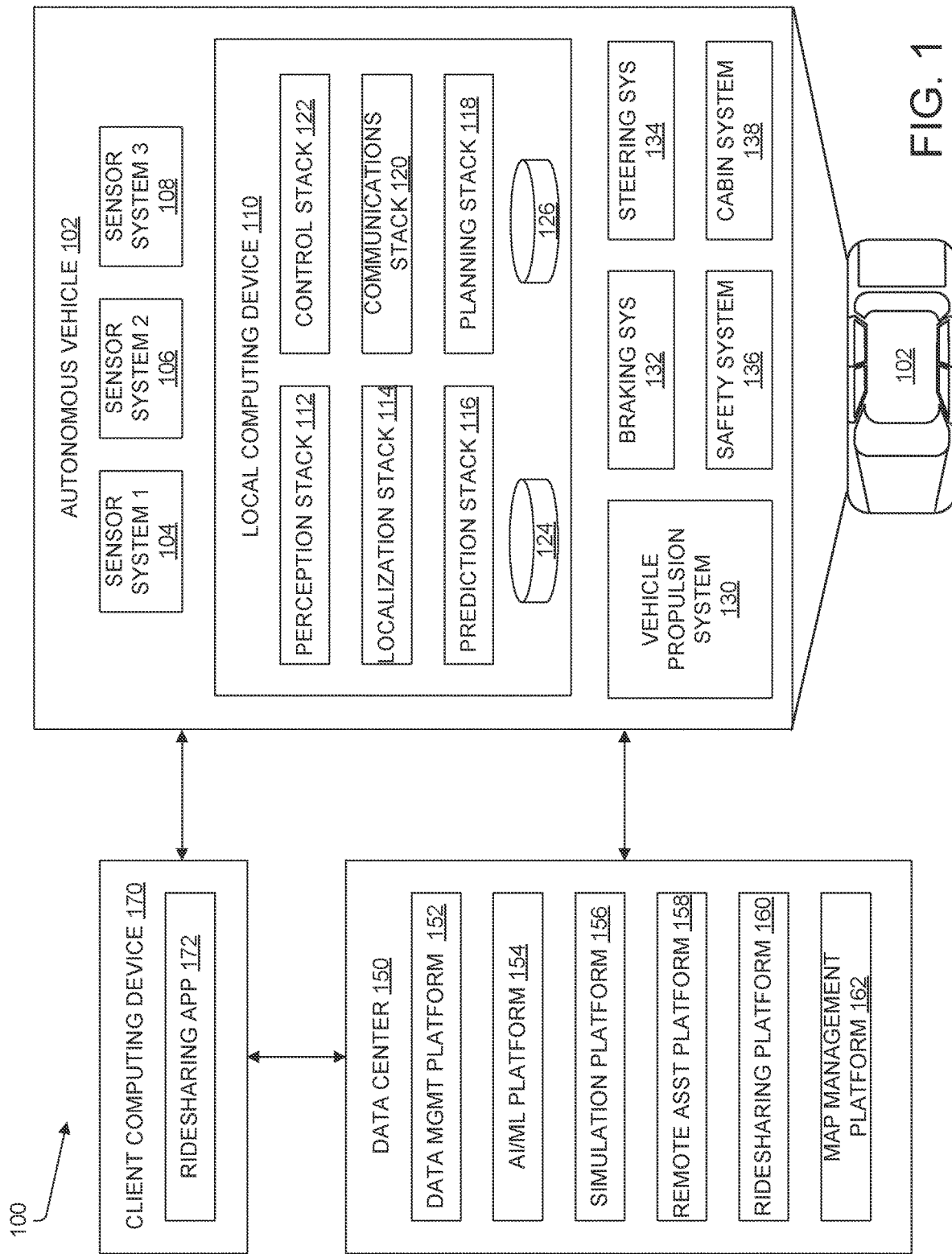
FIG. 1 is a diagram illustrating an example system environment that can be used to facilitate autonomous vehicle navigation and routing operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

AVs comprise various hardware components (including mechanical and electrical electronics) and software components that enable autonomous driving. More specifically, AVs utilize hardware components (e.g., sensors) to measure and collect data relating to a driving environment around the AVs, and utilize software features (e.g., AV driving compute platform, control algorithms for machine learning, prediction, and path planning, etc.) to analyze the inputs from those hardware components. For example, as previously explained, AVs can include various sensors, such as a camera, a LIDAR sensor, a RADAR sensor, amongst others, which the AVs can use to collect data and measurements. The sensors can provide the data and measurements to an internal computing system of the AV (e.g., an AV software stack, which includes include various stacks such as a perception stack, a control stack, a prediction stack, and a planning stack), in which the AVs use the sensor data for AV operations such as navigation.

System architectures for hardware components can be extremely diverse. Different and multiple hardware components have responsibilities and tasks to ensure the clear automatic vision and accurate measurements in a variety of driving environments (i.e., driving scenarios and conditions). How the hardware components are designed and configured for installation within the AVs can significantly vary depending on the conditions of the AVs and the driving environments. As follows, designing and selecting the optimal hardware configuration of AVs is crucial in order to provide useful input data for use by the AVs in executing an AV software stack for controlling the AVs. Further, an AV software stack needs to be appropriately tuned to the specific hardware configuration to meet the stringent performance, safety, cost, scale, and reliability of the AVs.

Due to the physical design of the hardware architecture, it can be costly and time-consuming to test different types of hardware configurations, for example, by physically adjusting hardware components. Therefore, there exists a need for optimizing a hardware configuration of an AV by using continuous learning machine and simulating the effect of various physical parameters. The present technology includes systems, methods, and computer-readable media for solving these problems and discrepancies. Specifically, aspects of the disclosed technology provide solutions for optimizing a hardware configuration of an AV based on an output of continuous learning machine. Further, the continuous learning machine process of the present disclosure can include simulating the effect of physical parameters that are generated by the continuous learning machine and estimating their impact on the safety/comfort/performance of an AV to determine the optimal hardware configuration(s) (and respective software configurations) of the AV.

Examples of the systems and techniques described herein are illustrated in FIG. 1 through FIG. 6 and described below.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SO-NAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5$^{th}$ Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The Intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 1160 can receive requests to pick up or drop off from the ridesharing application 1172 and dispatch the AV 1102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2B:
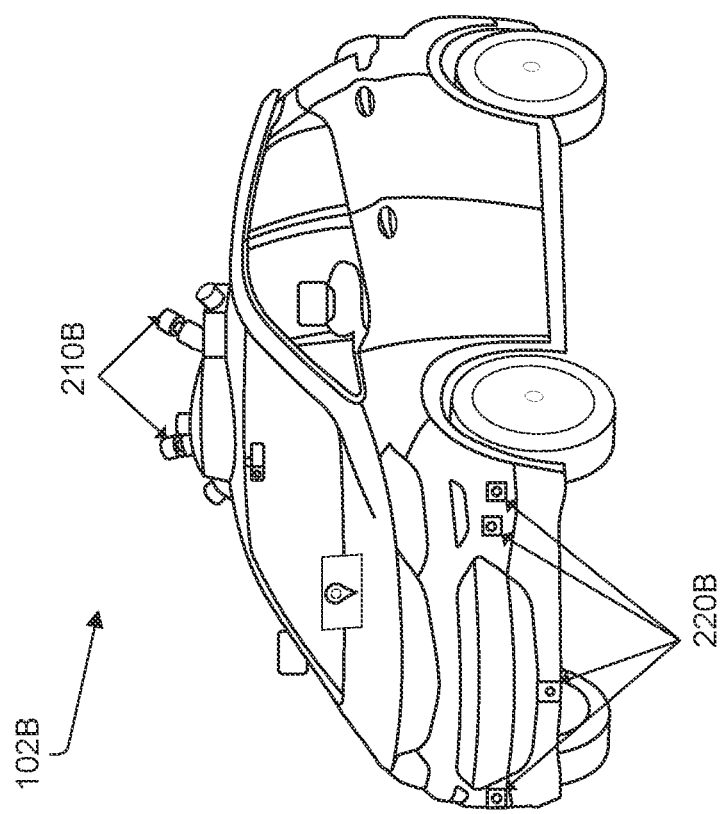
FIGS. 2A and 2B illustrate an example AV with various sensors mounted thereon, according to some examples of the present disclosure.
Figure 2A:
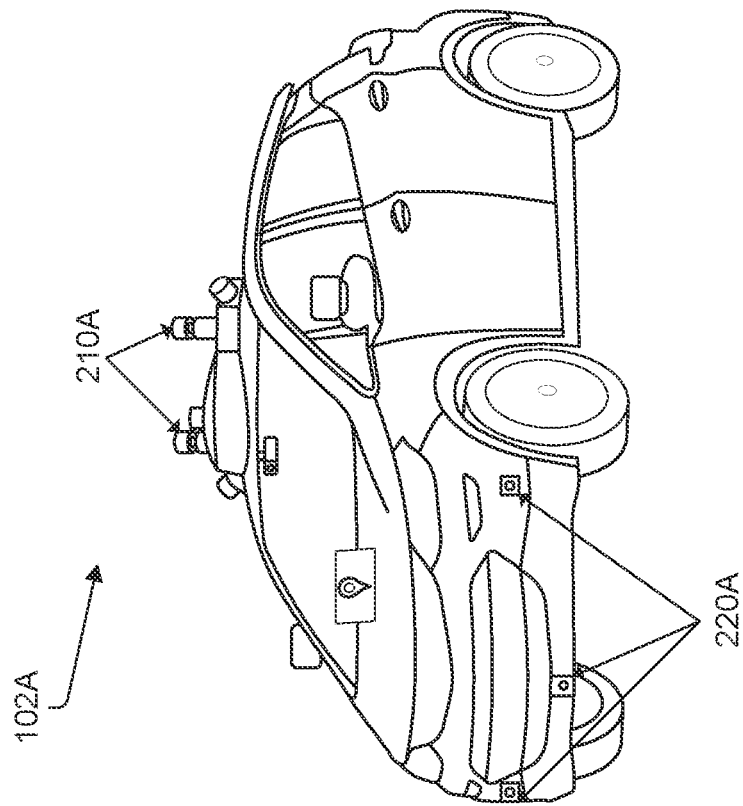

FIGS. 2A and 2B illustrate an example AV with various sensors mounted thereon 102A and 102B (collectively, AV 102, which is similar to AV 102 as illustrated in FIG. 1). As previously described, AV 102 comprises various hardware components including sensors such as cameras, LiDAR sensors, RADAR sensors, ultrasonic sensors, IMUs, etc. In the illustrative example of FIG. 2A, AV 102A comprises a plurality of LiDAR sensors 210A on top of AV 102A and three RADAR sensors 220A at the lower part of the front bumper. In FIG. 2B, AV 102B comprises a plurality of LiDAR sensors 210B on top of AV 102A and four RADAR sensors 220B at the lower part of the front bumper.

Various sensors mounted on AV 102 can have varying configurations, for example, with respect to a number of sensors, location, placement/position, resolution, scanning pattern, frame rate, firmware version, frequency, detection range, etc. As shown in FIGS. 2A and 2B, while LiDAR sensors 210A are mounted perpendicular to the top of AV 102A, LiDAR sensors 210B of AV 102B are slightly angled. Also, the number of RADAR sensors placed at the lower part of the front bumper can be different, for example, 3 sensors on AV 102A and 4 sensors on AV 102B.

Depending on the hardware configuration, the output of the sensors can vary. For example, LiDAR sensors 210A may have a different field of view than LiDAR sensors 210B due to the varying orientations. Also, having one more RADAR sensor on AV 102B may provide more useful information or merely redundant (or overlapping) information compared to AV 102A which has fewer RADAR sensors. As follows, the varying output based on different hardware configurations, which is provided to an AV software stack, can affect what/how the AV software stack perceives the surrounding environment, and therefore how it controls the AV.

As mentioned, while software configuration can be changed and/or updated without physically adjusting the software components or even can be managed virtually, reconfiguring hardware components can be difficult as it involved physical and manual adjustment, for example, tiling the angle of the sensors, and placing or removing sensors on AVs. The present disclosure provides solutions for optimizing the hardware configuration by simulating the effect of various hardware configurations that are generated by a continuous learning machine as discussed in detail below.

Figure 3:
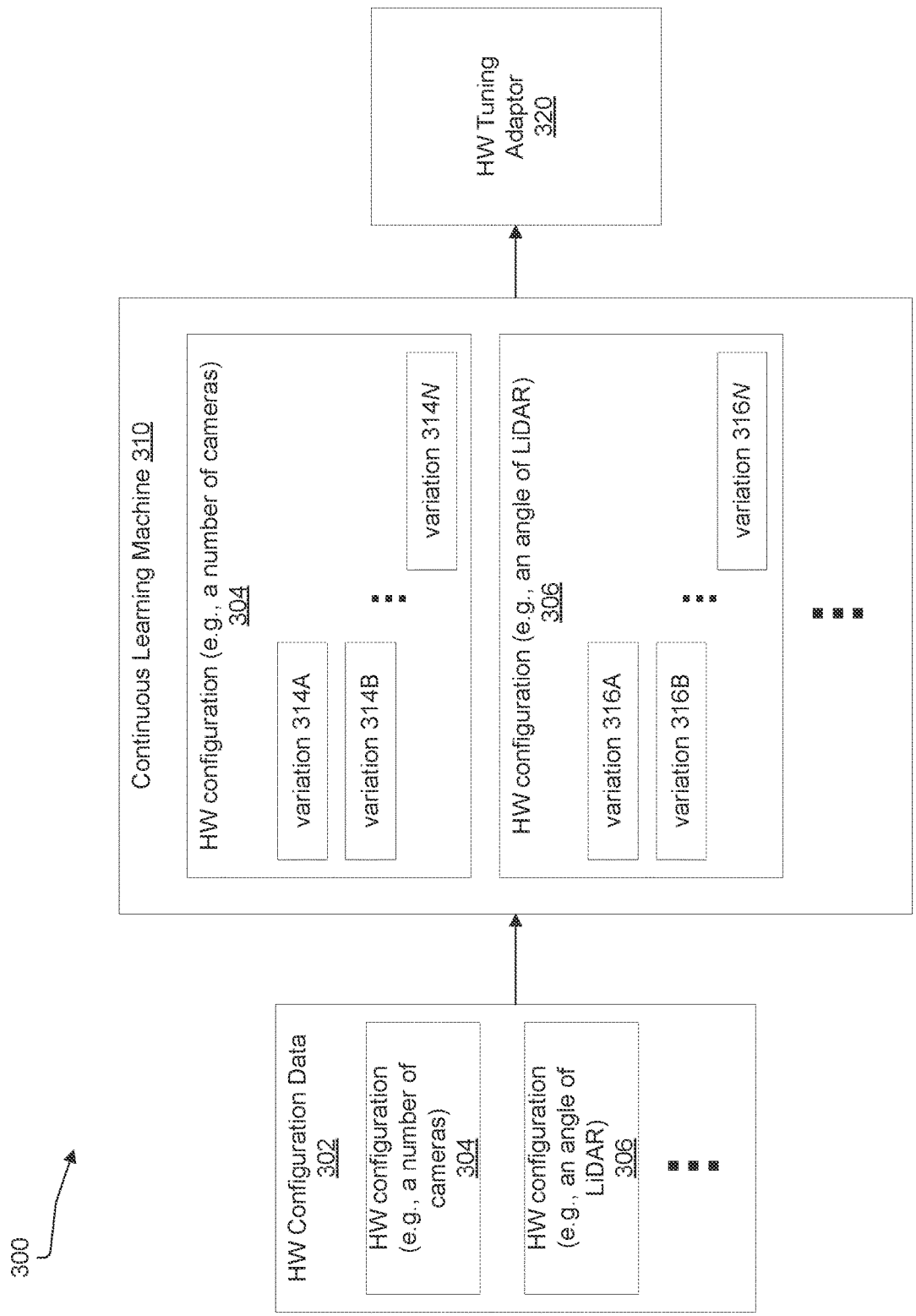
FIG. 3 illustrates an example continuous learning machine (CLM) process, according to some examples of the present disclosure.

FIG. 3 illustrates an example continuous learning machine (CLM) process 300. As illustrated in FIG. 3, the example CLM process 300 includes providing hardware (HW) configuration data 302 (e.g., of a particular AV such as an AV 102 as illustrated in FIG. 1) to a continuous learning machine 310 and providing the output of the continuous learning machine 310 to a hardware (HW) tuning adaptor 320.

To illustrate, the HW configuration data 302 describes one or more hardware configurations of an AV that specifies/defines physical or operational aspects of one or more hardware components of an AV. Examples of hardware components can include, without limitation, sensors such as a camera, a LiDAR sensor, an ambient light sensor, an infrared sensor, a RADAR sensor, an ultrasonic sensor, an IMU, a microphone, a speedometer, a tachometer, an odometer, an altimeter, a tilt sensor, an impact sensor, an airbag sensor, a seat occupancy sensor, an open/closed door sensor, a tire pressure sensor, a rain sensor, etc. Further, examples of hardware components can include mechanical systems of an AV (e.g., vehicle propulsion system 130, braking system 132, steering system 134, safety system 136, cabin system 138 as illustrated in FIG. 1), electrical systems of an AV (e.g., a battery system, circuits, computer systems, etc.) and/or any other hardware systems/components.

Furthermore, examples of hardware configurations that can be provided in the HW configuration data 302 can include, without limitation, a type of sensors, a number of the sensor(s), a location/position of the sensor(s) implemented by the AV (e.g., which can impact the field-of-view or field-of-coverage of the sensors), placement and/or position (e.g., angle, azimuth, orientation, elevation, pitch, yaw) of the sensor(s), a geometry or arrangement of the sensors with respect to each other and/or the AV, a combination of different types of sensor(s), a resolution of the sensor(s), a scanning pattern of the sensor(s), a frame rate of the sensor(s), a firmware version, brand, and/or model of the sensor(s), a frequency of the sensor(s), an exposure of one or more camera devices implementing one or more camera sensors, an operating temperature of the sensor(s), a power mode of the sensor(s) (e.g., a power/energy saving mode), a higher power mode (and thus higher operating parameters such as resolution, framerate, an off mode, and/or any other mode), an activation or acquisition pattern, and/or delay of the sensor(s), a scan azimuth, an elevation range and/or power level of the sensor(s), one or more settings of one or more hardware components of the AV, a lack or absence of synchronization, a thickness of sensor cover(s), a sensor offset distance from the surface of a vehicle, a type of material between a sensor and a vehicle body, a temperature of operation, a power setting of a sensor cooling system, a distance between sensors on the same vehicle, and/or an offset between a sensor and the vehicle boundary box.

For example, the HW configuration data 302 can comprise one or more HW configurations of a particular AV such as HW configuration 304, which defines a number of cameras mounted on the AV, HW configuration 306, which defines an angle of LiDAR placed on the AV, and so on.

As illustrated, the continuous learning machine 310 receives the HW configuration data 302 comprising HW configuration 304 specifying the number of cameras on the AV, HW configuration 306 specifying the angle of LiDAR on the AV, and/or any other HW configuration(s) associated with the AV (e.g., the current hardware configuration implemented on the particular AV). The continuous learning machine 310 can automatically (or semi-automatically) and continuously adjust the current hardware configurations (e.g., HW configuration 304, HW configuration 306, etc.) of the AV. More specifically, the continuous learning machine 310 continuously adjusts the current hardware configuration by a predetermined scale to generate variations of the current hardware configuration. For example, a predetermined value can be added or subtracted up to a threshold (e.g., a predetermined limit) to each HW configuration parameter to generate variations 314A, 314B, . . . , 314N and/or 316A, 316B, . . . , 316N, etc. In the example of FIG. 3, if the HW configuration 304 indicates that the number of cameras on the AV (e.g., the number of cameras placed near the front bumper of the AV) is 2, the continuous learning machine 310 can generate variations 314A, 314B, . . . , 314N that may include {3, 4, . . . , n}. In another example, if the HW configuration 306 indicates that the angle of LiDAR mounted on the AV (e.g., LiDAR sensor(s) mounted on the top of the AV) is 90 degrees, the continuous learning machine 310 can generate variations 316A, 316B, . . . , 316N that may include {85°, 80°, . . . , 0° }.

In some examples, the continuous learning machine 310, as automatically and continuously generating the multiple variations of the current hardware configuration(s) of the AV, can allow some of machine learning algorithms/models of the AV (e.g., a perception model, a prediction model, a planning model, etc.) to detect an object, predict a trajectory of an object, and/or plan a path of the AV in simulation based on each of the variations of the hardware configurations. More specifically, each of the variations of the hardware configurations or a different combination of these variations can be used in simulation to evaluate the effect of the variations (e.g., different hardware configurations) on the performance, safety, and/or comfort of the AV. The continuous learning machine 310 leverages active learning where it learns how well the hardware components (e.g., sensor(s)) are performing given the current hardware configuration and iteratively comes up with a new hardware configuration(s) (e.g., variations 314A, 314B, . . . , 314N for HW configuration 304, variations 316A, 316B, . . . , 316N for HW configuration 306), etc.), for example, in a loop.

In some examples, the output of the continuous learning machine 310 such as variations 314A, 314B, . . . , 314N of HW configuration 304, variations 316A, 316B, . . . , 316N of HW configuration 306, etc. can be provided to the HW turning adaptor 320. The HW tuning adaptor 320, for each variation of HW configuration(s), adapts/tunes the other components or systems of the AV (e.g., software parameters, mechanical parameters, or operating parameters) to align with the variations of HW configuration(s). In other words, the HW tuning adaptor 320 updates the software of the AV to optimize the software for the new hardware configurations (e.g., variations 314A, 314B, . . . , 314N and/or 316A, 316B, . . . , 316N, etc.).

For example, the HW tuning adaptor 320 can automatically update software parameters associated with data processing, machine learning, or mapping to adapt to the new HW configurations (e.g., variations 314A, 314B, . . . , 314N and/or 316A, 316B, . . . , 316N, etc.) to ensure that the AV with the new HW configuration does not fail due to the misalignment with the software components. Examples of software parameters can include, without limitation, machine learning algorithms and/or models (e.g., neural networks), any heuristics associated with an AV software stack, a range of perception, latency, etc. For example, the HW tuning adaptor 320 can adjust how sensor data is fused in the software based on each variation of the current position of the sensor(s). In another example, the HW tuning adaptor 320 can adjust the software node trigger times, thresholds, and/or ranges based on each variation of the current frequency of the sensor(s), the current scan range of the sensor(s), and/or the current brand/model of the sensor(s).

In some examples, hardware and software configurations can be adjusted/updated in a serial fashion where each adjustment is made to compensate for another. In other examples, hardware and software adjustments can be made in parallel to allow an automated AB testing (also often referred to as bucket testing or split-run testing). As follows, a natural evolution of both hardware and software configurations can be achieved simultaneously.

In some aspects, the HW tuning adaptor 320 can update operating parameters associated with an AV (e.g., AV 102 as illustrated in FIGS. 1-2B) based on the new hardware configuration. For example, an operating parameter of an AV 102 can be tuned to optimize safety, efficiency, and reliability based on each variation of the current hardware configuration(s) (e.g., variations 314A, 314B, . . . , 314N of HW configuration 304, variations 316A, 316B, . . . , 316N of HW configuration 306, etc.).

Further, the HW tuning adaptor 320 can update mechanical components of the AV such as chassis, sensor covers, and tires to compensate for the new hardware configuration(s) (e.g., variations 314A, 314B, . . . , 314N of HW configuration 304, variations 316A, 316B, . . . , 316N of HW configuration 306, etc.). For example, if the new hardware configuration involves tiling an angle of a sensor, a sensor cover may need to be adjusted to conform with the updated/new placement of the sensor that has been generated by the continuous learning machine 310.

Figure 4:
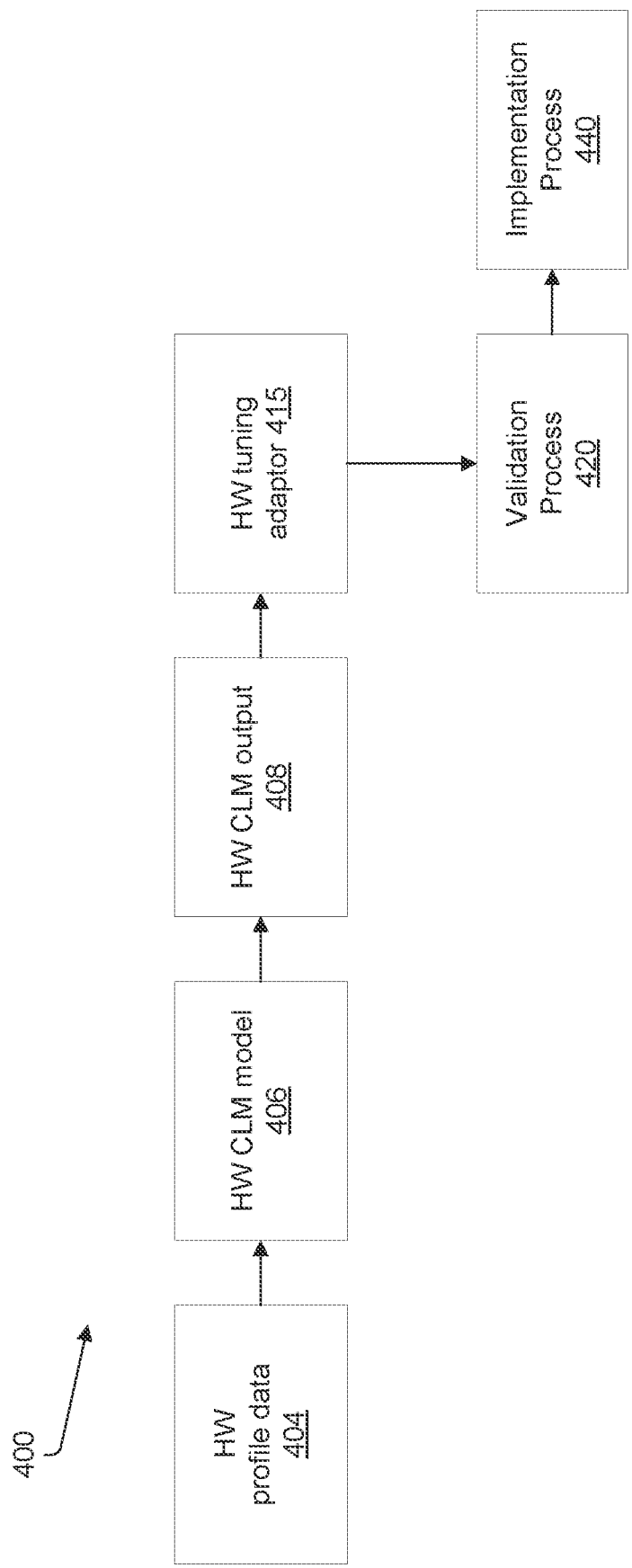
FIG. 4 illustrates a simplified block diagram of an example system for managing and optimizing a hardware configuration based on a CLM process, according to some examples of the present disclosure.

FIG. 4 illustrates a simplified block diagram of an example system 400 for managing and optimizing a hardware configuration based on the output of continuous learning machine (CLM).

In some examples, system 400 can receive hardware (HW) profile data 404 (similar to HW configuration data 302 as illustrated in FIG. 3) associated with hardware components of an AV (e.g., AV 102 as illustrated in FIGS. 1-2B) such as multiple sensor systems 104, 106, and 108 as illustrated in FIG. 1. In some aspects, hardware profile data 404 describes a hardware configuration of an AV, which includes the specific hardware components implemented by the AV and/or can be related to any design or operational characteristics/features/attributes of hardware components of the AV.

In some examples, AV sensor data (e.g., sensor data that has been collected by an AV while navigating on a road) can include metadata associated with a hardware configuration of an AV (i.e., data about how the hardware components such as sensors are installed on an AV). More specifically, AV sensor data can be captured by one or more sensors (e.g., sensor system 104, sensor system 106, sensor system 108 as illustrated in FIG. 1). HW profile data may be part of AV sensor data as metadata or may be embedded in sensor data. HW profile data may be provided by the user using a computer user interface. Alternatively, hardware profile data 404 can be included in input from a user (e.g., user input data) specifying a hardware configuration of an AV. In other examples, hardware profile data 404 can be based on a detected event such as an upgrade of hardware components, installation of hardware components, and/or repair or replacement of hardware components.

In some aspects, HW profile data 404 can be provided to a hardware (HW) continuous learning machine (CLM) model 406 (similar to the continuous learning machine 310 as illustrated in FIG. 3), which generates HW CLM output 408 based on the HW profile data 404 that specifies the current HW configuration of an AV.

More specifically, HW CLM model 406 can automatically (or semi-automatically) and continuously adjust or modify a value or parameter of the current hardware configuration(s) provided in HW profile data 404 to generate HW CLM output 408. Here continuous adjustments refer to adjustments that are made at the beginning of each operation, for example when the vehicle exiting a garage, storage facility or a parking spot. The HW CLM output 408 includes variations of the given/current hardware configuration(s) (e.g., variations 314A, 314B, . . . , 314N for HW configuration 304, variations 316A, 316B, . . . , 316N for HW configuration 306 as illustrated in FIG. 3).

In some examples, the value of the hardware configuration can be adjusted by adding or subtracting a predetermined scale/value. For example, an angle of a LiDAR sensor (e.g., LiDAR sensors 210A or 210B as illustrated in FIGS. 2A and 2B) mounted on top of AV 102 can be continuously adjusted by 10 degrees (e.g., 10°, 20°, 30°, . . . ). In another example, a number of RADAR sensors (e.g., RADAR sensors 220A or 220B as illustrated in FIGS. 2A and 2B) placed at the lower part of the front bumper of AV 102 can be changed by adding or removing one up to a predetermined limit. In some examples, HW CLM model 406 can generate the HW CLM output 408 including variations of the current hardware configuration(s) by applying a predetermined formula or rule.

In some examples, the HW CLM output 408 can be provided to an HW tuning adaptor 415 (similar to the HW tuning adaptor 320 as illustrated in FIG. 3). The HW tuning adaptor 415 is configured to update/modify/adjust other components (e.g., software parameters, mechanical parameters, or operating parameters) of an AV (e.g., AV 102 as illustrated in FIGS. 1-2B) based on HW CLM output 408 (e.g., for each variation of the current HW configuration(s)). More specifically, AV components can be adjusted/updated to compensate for HW CLM output 408 (i.e., to be aligned with HW CLM output 408) so that an AV does not fail from potential conflicts between updated parameters/configurations.

At validation process 420, system 400 can determine the validity of HW CLM output 408 by simulating an operation of an AV with HW CLM output 408. More specifically, system 400 can simulate an operation of an AV with each of the variations of the hardware configuration(s) provided in HW CLM output 408 and corresponding other updated AV components (e.g., software parameters, mechanical parameters, or operating parameters) to determine the safety, comfort, performance, and/or reliability of the AV when the current hardware configuration is updated/replaced with each variation of the current hardware configuration(s) provided in HW CLM output 408.

In some examples, a driving scenario for simulation (i.e., simulation scenario, test scenario, driving scene in simulation) is created based on augmented driving data that has been collected from one or more AVs with different hardware configurations.

In some examples, at validation process 420, system 400 can determine a performance score of the simulated AV, for each variation of the hardware configurations provided in HW CLM output 408 (or a different combination of HW configuration(s) or variations), based on the behavior of the AV in simulation so that each variation of the current hardware configuration can be evaluated. For example, the performance score can be based on the object detection accuracy (e.g., associated with a perception model), the tracking accuracy or the accuracy of predicting a trajectory of an object (e.g., associated with a prediction model), and/or planning accuracy (e.g., associated with a planning model). Further, the performance score can be metrics based on the safety and/or comfort of an operation of the AV in simulation.

At implementation process 440, one or more new hardware configurations provided in HW CLM output 408 can replace the initial hardware configuration of the AV. In some examples, the update with a new hardware configuration can be executed based on a predetermined sensitivity threshold (i.e., a preference that defines how a frequency of the update cadence). The predetermined sensitivity threshold can be based on various factors or a combination thereof (e.g., performance score, timing, cost of the updates, convenience of updating/replacing components).

In one example, system 400 can determine a difference between the performance score of an AV with the initial hardware configuration and the performance score of the simulated AV with the new HW configuration provided in HW CLM output 408. If the difference exceeds an update sensitivity threshold, the new hardware configuration can be implemented on the AV. In another example, the predetermined sensitivity threshold is based on timing (e.g., update intervals, periodicity such as daily, bi-weekly, weekly, semi-annual, or annual updates).

Figure 5:
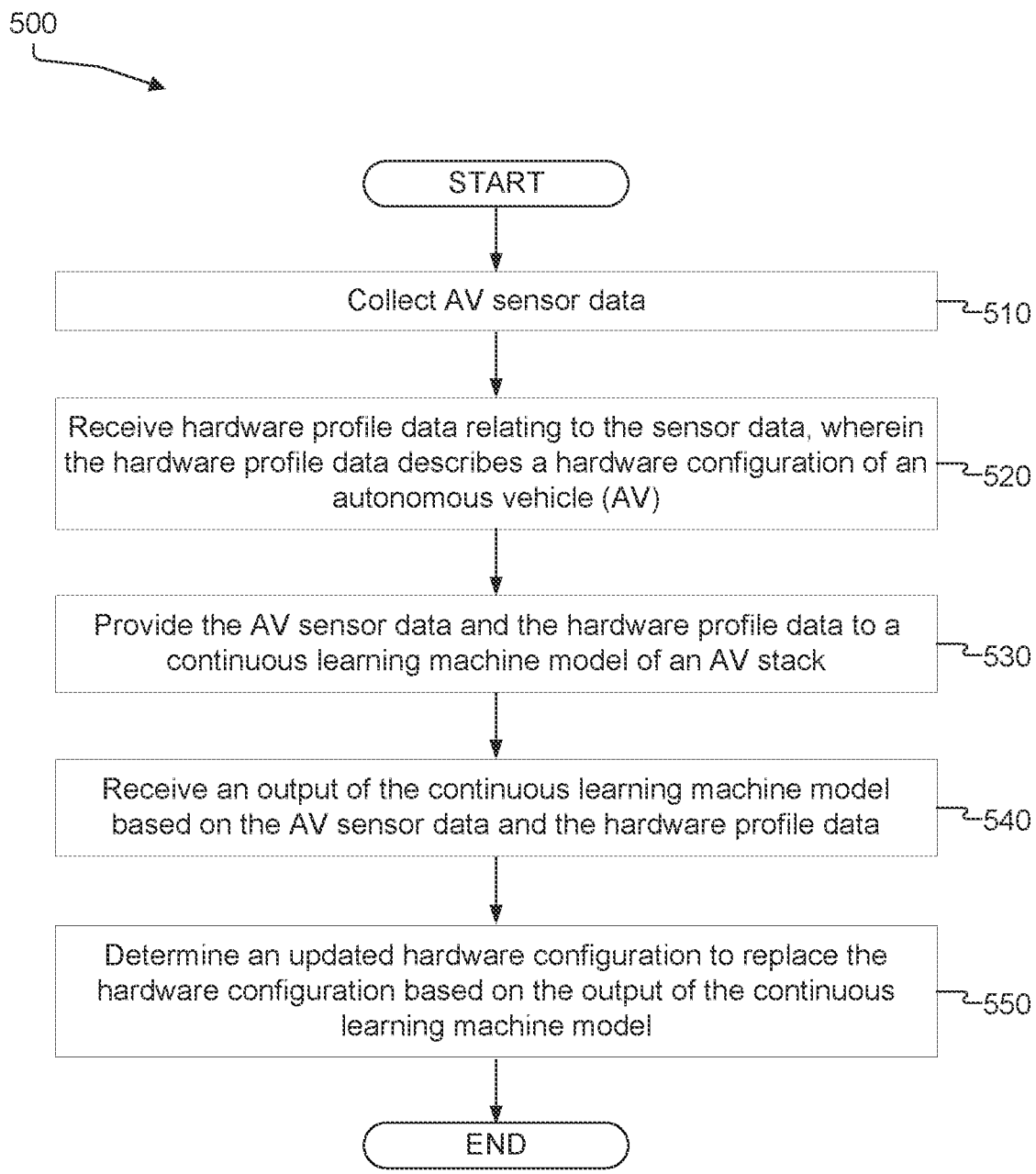
FIG. 5 is a flowchart illustrating an example process for optimizing a hardware configuration of an AV using continuous learning machine, according to some examples of the present disclosure.

FIG. 5 is a flowchart illustrating an example process 500 for optimizing a hardware configuration of an AV using continuous learning machine. Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

At step 510, process 500 includes collecting AV sensor data. For example, system 400 as illustrated in FIG. 4 can collect AV sensor data captured by one or more AV sensors while navigating on a road.

At step 520, process 500 includes receiving hardware profile data relating to the sensor data. The hardware profile data describes a hardware configuration of an AV. For example, system 400 as illustrated in FIG. 4 can receive HW profile data 404 (e.g., HW configuration data 302 as illustrated in FIG. 3) that describes a hardware configuration of an AV (e.g., AV 102 as illustrated in FIGS. 1-2B).

At step 530, process 500 includes providing the AV sensor data and the hardware profile data to a continuous learning machine model. For example, system 400 as illustrated in FIG. 4 can provide AV sensor data and HW profile data (e.g., HW configuration data 302 and/or HW profile data 404) to continuous learning machine 310 and/or HW CLM model 406.

At step 540, process 500 includes receiving an output of the continuous machine learning model based on the AV sensor data and the hardware profile data. For example, system 400 as illustrated in FIG. 4 can receive HW CLM output 408 (e.g., variations 314A, 314B, . . . , 314N for HW configuration 304, variations 316A, 316B, . . . , 316N for HW configuration 306) of HW CLM model 406.

At step 550, process 500 includes determining an updated hardware configuration to replace the hardware configuration based on the output of the continuous learning machine model. For example, system 400 can determine a new HW configuration to replace the initial hardware configuration based on HW CLM output 408.

Figure 6:
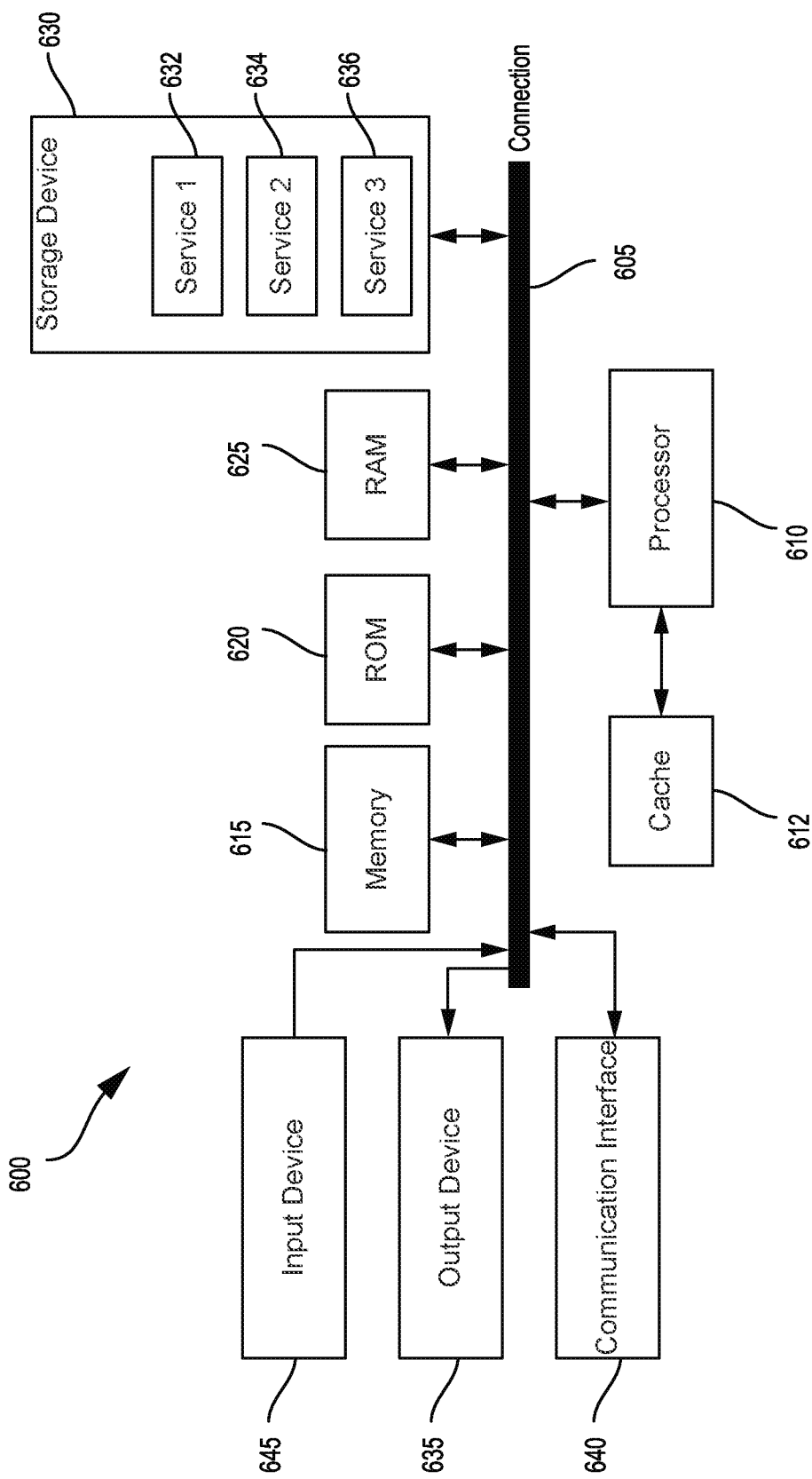
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

SELECTED EXAMPLES

Illustrative examples of the disclosure include:

Aspect 1. A method comprising: collecting autonomous vehicle (AV) sensor data; receiving hardware profile data relating to the AV sensor data, wherein the hardware profile data describes a hardware configuration of an AV; providing the AV sensor data and the hardware profile data to a continuous learning machine model of an AV stack; receiving an output of the continuous learning machine model based on the AV sensor data and the hardware profile data; and determining an updated hardware configuration to replace the hardware configuration based on the output of the continuous learning machine model.

Aspect 2. The method of Aspect 1, wherein the output of the continuous learning machine model is generated by continuously adjusting a value of the hardware configuration by a predetermined scale.

Aspect 3. The method of Aspect 1 or 2, further comprising: performing an operation of the AV with the updated hardware configuration in simulation to determine a behavior of the AV with the updated hardware configuration.

Aspect 4. The method of Aspect 3, further comprising: determining a performance score of the AV with the updated hardware configuration based on the behavior of the AV with the updated hardware configuration in simulation.

Aspect 5. The method of Aspect 4, wherein the performance score is based on at least one of safety and comfort of an operation of the AV.

Aspect 6. The method of Aspect 4, further comprising: in response to determining that a difference between the performance score of the AV with the updated hardware configuration and a performance score of the AV with the hardware configuration exceeds an update sensitivity threshold, replacing the hardware configuration with the updated hardware configuration on the AV.

Aspect 7. The method of Aspects 1 to 6, further comprising: adjusting one or more parameters associated with a software of the AV based on the updated hardware configuration to compensate for the updated hardware configuration.

Aspect 8. The method of Aspects 1 to 7, further comprising: updating at least one operating parameter of the AV based on the updated hardware configuration.

Aspect 9. The method of Aspects 1 to 8, wherein the hardware configuration is associated with sensors mounted on the AV, the sensors including at least one of a camera, a Light Detection and Ranging (LiDAR) sensor, a Radio Detection and Ranging (RADAR) sensor, an ultrasonic sensor, and an Inertial Measuring Unit (IMU).

Aspect 10. The method of Aspects 1 to 9, wherein the hardware configuration comprises at least one of a number of sensors, a location of the sensors, placement of the sensors, a resolution of the sensors, a scanning pattern of the sensors, a frame rate of the sensors, a firmware version of the sensors, and a frequency of the sensors.

Aspect 11. The method of Aspects 1 to 10, wherein the continuous machine learning model includes a perception model configured for object detection.

Aspect 12. The method of Aspects 1 to 11, wherein the continuous machine learning model includes a prediction model configured to predict a trajectory of an object.

Aspect 13. The method of Aspects 1 to 12, wherein the continuous machine learning model includes a planning model configured to plan a path of the AV.

Aspect 14. A system comprising: a memory; and one or more processors coupled to the memory, the one or more processors being configured to: collect autonomous vehicle (AV) sensor data; receive hardware profile data relating to the AV sensor data, wherein the hardware profile data describes a hardware configuration of an AV; provide the AV sensor data and the hardware profile data to a continuous learning machine model of an AV stack; receive an output of the continuous learning machine model based on the AV sensor data and the hardware profile data; and determine an updated hardware configuration to replace the hardware configuration based on the output of the continuous learning machine model.

Aspect 15. The system of Aspect 14, wherein the output of the continuous learning machine model is generated by continuously adjusting a value of the hardware configuration by a predetermined scale.

Aspect 16. The system of Aspect 14 or 15, wherein the one or more processors are configured to: perform an operation of the AV with the updated hardware configuration in simulation to determine a behavior of the AV with the updated hardware configuration.

Aspect 17. The system of Aspect 14 to 16, wherein the one or more processors are configured to: adjust one or more parameters associated with a software of the AV based on the updated hardware configuration to compensate for the updated hardware configuration.

Aspect 18. The system of Aspect 14 to 17, wherein the one or more processors are configured to: update at least one operating parameter of the AV based on the updated hardware configuration.

Aspect 19. The system of Aspect 14 to 18, wherein the hardware configuration is associated with sensors mounted on the AV, the sensors including at least one of a camera, a Light Detection and Ranging (LiDAR) sensor, a Radio Detection and Ranging (RADAR) sensor, an ultrasonic sensor, and an Inertial Measuring Unit (IMU).

Aspect 20. A non-transitory computer-readable medium having stored thereon instructions which, when executed by one or more processors, cause the one or more processors to perform operations in accordance with any one of Aspects 1 to 13.

Aspect 21. A system comprising means for performing a method according to any of Aspects 1 to 13.

What is claimed is:

1. A system comprising:
    a memory; and
    one or more processors coupled to the memory, the one or more processors being configured to:
        collect autonomous vehicle (AV) sensor data;
        receive hardware profile data relating to the AV sensor data, wherein the hardware profile data describes a hardware configuration of an AV;
        provide the AV sensor data and the hardware profile data to a continuous learning machine model of an AV stack;
        receive an output of the continuous learning machine model based on the AV sensor data and the hardware profile data, the output comprising a proposed updated hardware configuration;
        perform an operation of the AV with the proposed updated hardware configuration in a simulation to determine a behavior of the AV;
        determine a performance score for the proposed updated hardware configuration based on the behavior of the AV in the simulation; and
        determine an updated hardware configuration to replace the hardware configuration based on the performance score.

2. The system of claim 1, wherein the output of the continuous learning machine model is generated by continuously adjusting a value of the hardware configuration by a predetermined scale.

3. The system of claim 1, wherein the one or more processors are configured to:
    perform an operation of the AV with the updated hardware configuration in simulation to determine a behavior of the AV with the updated hardware configuration.

4. The system of claim 1, wherein the one or more processors are configured to:
    adjust one or more parameters associated with a software of the AV based on the updated hardware configuration to compensate for the updated hardware configuration.

5. The system of claim 1, wherein the one or more processors are configured to:
    update at least one operating parameter of the AV based on the updated hardware configuration.

6. The system of claim 1, wherein the hardware configuration is associated with sensors mounted on the AV, the sensors including at least one of a camera, a Light Detection and Ranging (LiDAR) sensor, a Radio Detection and Ranging (RADAR) sensor, an ultrasonic sensor, and an Inertial Measuring Unit (IMU).

7. The system of claim 1, wherein the one or more processors are configured to, in response to determining that a difference between the performance score and a performance score of the AV with the hardware configuration exceeds an update sensitivity threshold, replace the hardware configuration with the proposed updated hardware configuration on the AV.

8. A non-transitory computer-readable medium having stored thereon instructions which, when executed by one or more processors, cause the one or more processors to:
    collect autonomous vehicle (AV) sensor data;
    receive hardware profile data relating to the AV sensor data, wherein the hardware profile data describes a hardware configuration of an AV;
    provide the AV sensor data and the hardware profile data to a continuous learning machine model of an AV stack;
    receive an output of the continuous learning machine model based on the AV sensor data and the hardware profile data; and
    determine an updated hardware configuration to replace the hardware configuration based on the output of the continuous learning machine model.

* * * * *